Patented Mar. 3, 1953

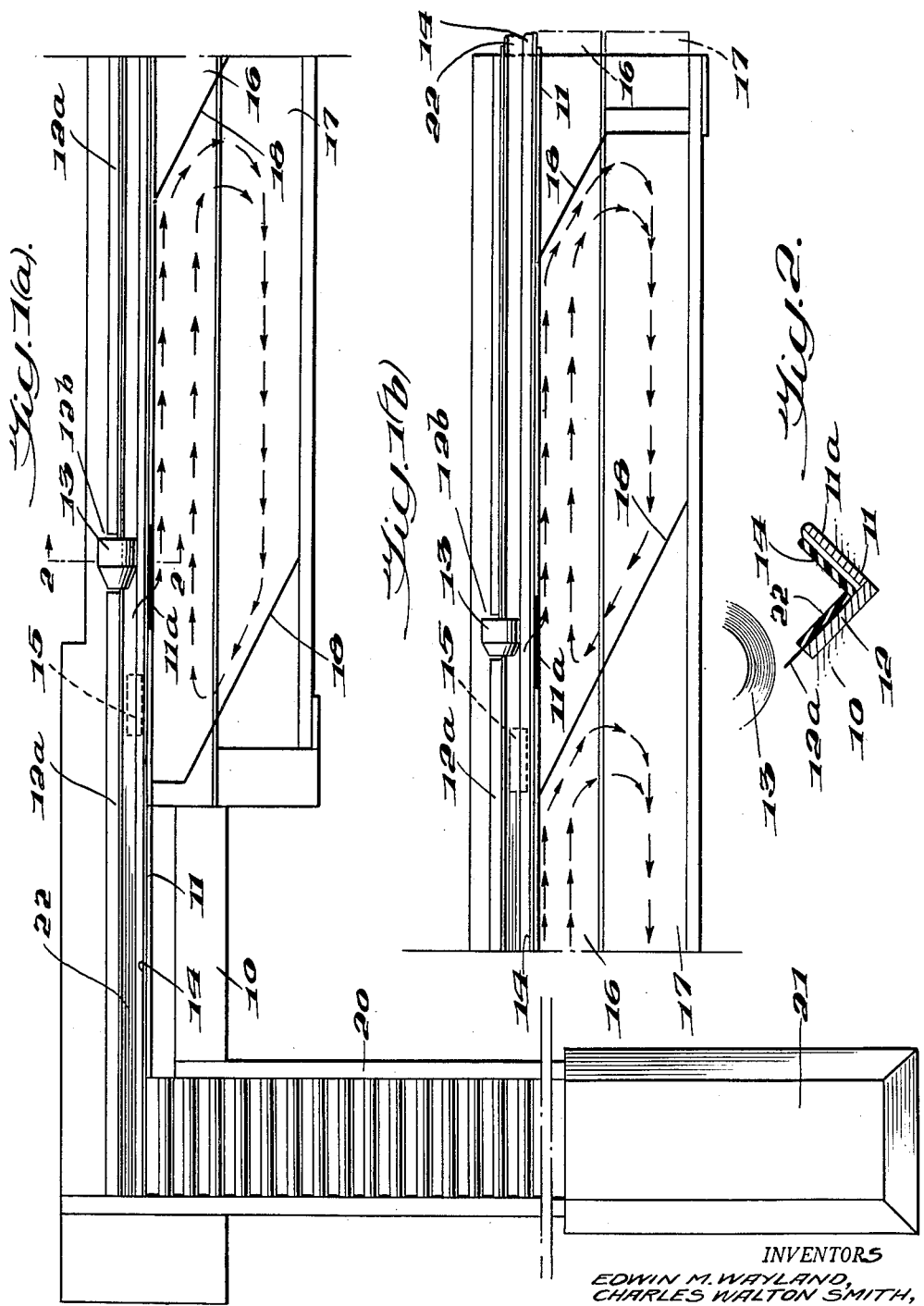

2,630,223

UNITED STATES PATENT OFFICE 2,630,223

FRUIT GRADING DEVICE

Edwin M. Wayland, Covesville, Va., and Charles Walton Smith, Bridgeville, Del.; said Smith assignor to said Wayland Application January 6, 1950, Serial No. 137,128

4 Claims. (Cl. 209—73)

This invention relates to fruit sizing methods and machines and is particularly adapted to improve the type of machine utilizing a carrier trough provided with a fruit spinning belt and positive action means for ejecting fruit from such spinner-belt. Edwin M. Wayland Patents Nos. 1,672,441, issued June 5, 1928; 1,673,172, issued June 12, 1928; 1,696,060, issued December 18, 1928; 1,706,368, issued March 19, 1929; 1,925,158, issued September 5, 1933; and 2,285,955, issued June 9, 1942, pertain to this type of machine, which is the preferred type of machine for sizing of apples and like fruits. At the word "fruits," applied to a species, is both singular and plural, for clarity herein, the words "apple" and "apples" are sometimes employed as synonymous with "fruit," where a distinction between the singular and plural is desired.

In machines of the aforesaid type a spinner-belt travels along one face, which may be termed the front face, of a V-shaped trough having its sides at right-angles to each other; and most fruit, resting against the spinner-belt at one side, and on the stationary back of the trough at the other, is caused thereby, or by the pressure of upedging brushes located thereabove, to assume an "upedged" position with its periphery tangent to the spinner-belt and with its stem or calyx end contacting the back wall of the trough. In this position the motion of the belt imparts spinning motion to the fruit so that as it progresses along the trough, all of its transverse diameters are presented under the ejecting means with the result that the fruit is sorted out of the sizing trough if its largest transverse diameter is equal to or greater than the gauging distance between the ejector and the spinner-belt. With a spinner-belt traveling at about 180 feet per minute and properly spinning the fruit in such known machines the fruit was formerly thought to travel along the sizing trough at about 60 feet per minute. As an incident to the present invention it has been discovered that when the upedging means is not acting on the fruit, the rate of progress of the fruit along the trough due to the action of the belt along, is about one-sixth of the belt speed; that under the upedgers this rate is increased to about half the belt speed, and that the supposed rate of progress of about one-third of the belt speed was actually the average speed of fruit alternately accelerating and decelerating between these limits.

In machines of this type, the fruit is usually fed into the entrance end of the machine endwise along the trough, or from one side of the trough. In either case there is some tendency of the fruit to pile up at the entrance end of the trough. Such piling up, particularly when the machine is being heavily fed, is apt to jam two or three apples together so that they cannot spin, with the result that certain apples, particularly in the case of relatively flat apples short in their axial dimensions, travel down the trough riding flat against the spinner-belt. Under such circumstances the non-spinning apples tend to travel at a rate approaching that of the spinner-belt and to collide with spinning fruit and knock down such spinning fruit so that it also rides flat. If they continue to travel flatwise, such apples may pass under one or more of the ejectors without presenting their transverse diameters thereto.

In addition, and especially when high-friction spinner-belts are used, certain ones of odd-shaped apples such as the York apple tend to develop a sort of jogging motion on the belt; and this slight bouncing up and down on the fixed back results in inaccuracy of sizing when such apples pass under the ejecting means and a tendency toward "burning" or local friction browning of small areas of the kin of tender-skinned fruit.

With the foregoing and other difficulties in mind, the present invention has among its objects, severally and interdependently, to provide means associated with one or more of the sizing stations of a sizing trough for preventing the fruit from presenting unwanted sides to the ejector and, instead, for assisting the spinner-belt in upedging the fruit and carrying it under the ejector smoothly and rotating properly on its core axis only; to provide such means especially coordinated to cause the apples to move with certainty, at nearly constant speed, and without delay, along the sizing trough; to provide, in association with upedging means, means assuring advance of the apples thereunder without stalling even though the upedging means may bear heavily against the fruit; to provide a sizing trough having a longitudinally moving back portion at substantially right-angles to the spinner-belt, and traveling through an ejecting or upedging station or both at approximately one-third of the speed of the spinner-belt; to provide a sizing trough having means to positively advance the apples in upedged position through a sizing station and reduce the tendency of the spinner-belt to slide under and cause jogging of them; to provide a method and apparatus for presenting the apples to the ejector and upedging means in a manner increasing the capacity of the machine by fifty to one-hundred per cent as compared to prior machines, while increasing the accuracy of sizing; to provide a method and means for so advancing the apples that upedging brushes cooperate to better advantage therewith; and to provide details of construction and arrangements of parts contributing to the attainment of the aforesaid and other objects. The invention itself consists in the novel steps, features and combinations herein disclosed and defined in the appended claims.

In the accompanying drawings of an illustrative embodiment of the invention:

Fig. 1, broken into parts 1(a) and 1(b), is a diagrammatic plan view of an apple sizing machine embodying one form of the invention.

Fig. 2 is a more or less diagrammatic transverse section taken on the line 2—2 of Fig. 1 looking in the direction indicated by the arrows thereon.

In its general aspects, the present invention provides a method of transporting and sizing of apples and like non-spherical fruit by supporting the non-sperical fruit to rotate on its core axis and simultaneously imparting to it with respect to that axis a reverse-English spinning and advancing movement along a path extending through upedging and sizing zones while simultaneously imparting to the fruit a second component of advancing movement along said path and through said zones. This method improves and stabilizes the ratio of rotational and translational speeds of the upedged fruit, reduces collisions of advancing fruit, and calms materially the ejection of the fruit. In preferred practice of the method the fruit is advanced at a rate greater than one-third and less than one-half of its peripheral spinning rate, and in particular it appears that superior action is achieved when the ratio of rotational and translation speeds imparted to the fruit by this method is so maintained that very little, if any, change therein occurs under the action of the upedging means or under that of the ejecting means. Theoretically, this method accelerates the speed of flow of the fruit through the sizing station by about fifty per cent; but in practice, its use increases the capacity of the sizer to a much greater extent, perhaps one-hundred per cent. Post-discovery analysis indicates that the present method not only accelerates but also stabilizes the rate of advance of the apples and prevents the collision of advancing apples, so that the sizing path can be kept more completely full of apples without the danger of trough choking which limited the closeness with which apples could follow one another through the stationary-back type machines.

The method is preferably practiced by supporting the fruit as it approaches and passes under the ejecting means and upedging means, on two surfaces at right-angles to each other and both moving in the direction of advance with one of the surfaces moving several times, and preferably nearly three times, as fast as the other.

Referring to the drawings of the illustrative embodiment, the type of machine shown therein comprises a frame 10 supporting a sizing trough made up of a front member 11 and a back member 12 positioned at right-angles to each other. The front member 11 in the form shown is of wood and is preferably cut away, as at 11a, under the ejectors or sizing wheels 13, for providing anti-pinching means in accordance with the aforesaid Patents Nos. 1,672,441 and 1,925,158, but the operation of which seems to be improved by the present method. The back member 12, in the form shown, comprises a relatively low wooden member, on the face of which may be mounted a stainless steel or other noncorroding anti-friction surface 12a. Such stainless steel surfaces 12a, heretofore used in stationary-back machines, may be retained on conversion of such machines to include the present improvements; but as the present invention prevents contact of the fruit with the wall 12, 12a, it permits use of a completely wooden wall 12, 12a with consequent economy. For sizing of apples and the like, the wall 12, 12a as shown may extend to a height of about four inches from the trough bottom, and may be cut away in proximity to the sizing rolls 13 to provide clearance therefor, as indicated at 12b.

The sizing belt 14, herein usually termed the spinner-belt, travels on the inner face of the trough front 11 in the conventional manner, passing over conventional belt pulleys (not shown) at the ends of its run, and having its return run (not shown) in any suitable position, and constitutes one of the moving surfaces above mentioned.

The ejectors or sizing wheels 13 may be of any suitable form, as illustrated, for example, in any of the above-mentioned patents, but preferably are of the high-friction tapered inlet forms shown in Patents Nos. 2,285,955 and 1,925,158, and preferably are provided with suitable adjusting means (not shown) similar to the adjusting means disclosed in Patents Nos. 1,673,172 and 2,285,955. Certain ones, or each, of the ejectors 13 may be preceded by upedging means 15 of suitable form; for example, the brush means of Patent No. 1,696,066 aforesaid may be employed, or any alternative form.

Suitable means may also be provided to receive the sized fruit ejected at the several ejector stations, which may take the form of conventional bins, or may take the form of bins bottomed by distributing belts 16 and 17 supported on suitable belt pulleys and moving in opposite directions, to distribute the ejected fruit over a relatively long bin front to accommodate a desired number of packers. The several bin-separating partitions 18 may be made longitudinally adjustable to vary the sizes of the bins, but this provision forms no part of the present invention. In the form shown in Fig. 1, the sizing trough 11—12 is side-fed at its entrance end by a roller conveyor 20 leading from any suitable source of apples, such as a receiving or sorting table 21.

In accordance with the present invention, the back wall 12—12a of the sizing trough in the form shown is provided in underlying relation to the ejector means 13, and herein throughout its extent, with a second moving surface or booster belt 22. In the form shown, this belt is supported at the ends of its run on belt pulleys (not shown) preferably below the level of the trough. Such belt pulleys may be mounted on horizontal axes and the belt 22 may twist to engage the same after leaving the supporting wall of the trough. This same horizontal axis type of pulley mounting may be used at both ends of the booster belt 22 and at both ends of spinner-belt 14 if desired. The pulleys toward which the trough-supported runs of the belt are drawn are preferably the driven pulleys, as this maintains tightness of the trough runs of the belts, and suitable belt-tightening means (not shown) may be provided, if desired.

In accordance with the present invention, the booster belt 22 is desirably driven at about one-third the speed of the spinner-belt; e. g., at about 60 feet per minute when the spinner-belt travels at about 180 feet per minute. With this arrangement, the motion of the booster belt causes the fruit to settle firmly into the trough against the spinner-belt and spinning of the fruit is thus more positively assured. With a booster belt moving 60 feet per minute and a spinner-belt moving 180 feet per minute, the spinning fruit advances at approximately 90 feet per minute; and the capacity of the machine is correspondingly increased. Furthermore, since a major part of this advancing speed is direct translation, and ony a minor part of it is induced by the differential or spinning component of the spinner-belt speed, the tendency of the apples to jog up and down or bounce on the spinner-belt is reduced. The more positive upedging and the smoother advance thus achieved materially increases the accuracy of sizing of the fruit. The employment of the booster belt, which may be of canvas, or of any other suitable material, preferably of relatively low-friction characteristic, since it reduces the jogging of the fruit, which, in the case of stationary back machines, was more pronounced with a high-friction spinning belt than a low-friction one, thus seems to remove an objection to the use of a high-friction spinner-belt; for example, a scored or like rubber surfaced belt, as is desirable for other reasons.

As above mentioned, the machine may be equipped with upedging brushes or like upedging means 15 in advance of one or more of the ejecting elements, and the operation of such upedging means appears to be improved by the employment of the booster belt. While applicants are not required to understand the reason for the improvement, and are not to be considered bound by the apparent explanation, the reasons they believe to account for this improvement will now be set forth as they seem to explain this unpredicted result.

Upedging brushes tend to press the fruit more tightly against the sizing trough, and with the former stationary back machines, where the spinner-belt has a relatively high coefficient of friction as compared to the stationary supporting surface of the trough, the result seems to be that the apples tend under the upedging brushes to assume an advancing speed approaching half the speed of the spinner-belt. In other words, with a spinner-belt running at about 180 feet per minute in a stationary back machine, and neglecting slippage; the apples, tending to move about 30 feet per minute and tending to rotate with a peripheral speed of about 150 feet per minute in the clear, seem to tend under the brush to accelerate their forward motion to about 90 feet per minute, and to reduce in rotational peripheral speed to about 90 feet per minute. It thus appears that under these conditions, when an apple leaves the upedging brush it must again slow down translationally, and speed up rotationally. It is believed that these sudden changes in condition are among the factors which tended to produce jogging and inaccuracy of sizing in the stationary back machines as well as an average rate of progress of the fruit of about 60 feet per minute with a 180 feet per minute belt speed.

When the booster belt, traveling at about one-third the spinner-belt speed, is employed; the fruit seems to move along the trough translationally at about 90 feet per minute (about 60 feet per minute being pure translation, and about 30 feet per minute resulting from the differential or spinning component of the spinner-belt speed) and seems to rotate at a peripheral speed of about 90 feet per minute. With these conditions when an apple reaches the upedging brush, the brush apparently only very slightly changes its translational speed, and only very slightly changes its peripheral rotational speed. Under these conditions, when the fruit leaves the upedging brush, very little if any speed adjustment need take place as compared to those incident to the combination of upedging brushes with the stationary back sizing trough. Whatever the reasons, the upedging brushes still seem to perform their function on stubborn apples or apples intentionally wrongly placed in the trough, and without producing jumping or jogging of the apples tending toward inaccuracy of sizing.

In the sizing of apples, moreover, it is highly important that the surfaces of the spinner and booster belts be substantially at right-angles to each other. The reason for this seems to be due to the fact that on the average, the planes including the greatest diameters of the fruit tend to be parallel to the planes of the flat stem-ends and calyx-ends of the fruit. In the case of symmetrical fruits, these planes may be termed the girdle planes and the flat polar planes. When the right-angled relationship of the belt surfaces, shown in Fig. 2, is adhered to, a flat-ended fruit spins smoothly and uniformly about an axis normal to the polar plane of the end thereof resting against the booster belt surface, and presents its girdle plane of maximum diameters perpendicular to the surface of the spinner-belt so that the actual maximum diameters are gauged. The right-angled relationship also insures that the "crowned pulley" action of the belt against the apples tends to orient them in this most advantageous and most smoothly riding position. That is, with this relationship, both the "shaking down" of the flat or polar end of the fruit against the booster belt, and the "crowned pulley" action of the spinner-belt tending to cause the fruit to present its girdle plane of maximum circumference at right-angles to the spinner-belt, act together to steady the fruit in the best position for sizing, and do not act in varying degree against each other to produce a tendency of the fruit to wobble. The ejector means 13 are preferably located, as shown in Fig. 2, in such position that the average girdle plane, of the size of fruit being selected, falls as nearly as possible squarely between the spinner-belt 14 and the most proximate surface of the ejector.

As above mentioned, the present method seems to improve not only the accuracy of sizing, but also the smoothness of operation of the ejector. The improvement in accuracy seems principally due to the reduction or elimination of bouncing or jogging of the fruit on the spinner-belt. This not only reduces jogging contact of undersized fruit with the ejector, but also may reduce possible depressions of the unsupported section of the belt (where the wooden trough or other solid support for the belt is cut away, as at 11a, to provide anti-pinching means) under the jogging action, which might allow slightly oversized fruit to pass the ejector.

The improvement in gentleness of operation of the ejector seems in part to be due to the reduction in jogging, but seems further to be due to the same factors which improve the operation of the upedging means. With the former stationary-back machines, especially with nonsymmetrical fruit, an occasional apple is projected into the bin rather violently by the ejector wheel. This seems to be largely or completely eliminated by the present improvement. Post-discovery analysis makes it appear that this is probably due to the fact that the apple as previously transported tended to accelerate in translational speed when it contacted the ejector, just as it did under the upedgers, and that when the shape of the apple was such as to prolong this contact for an appreciable time, this acceleration resulted in the rather violent discharge of the apple into the bin. Since with the present invention the tendency to change speed under top contact is reduced or eliminated, it appears this may account for the noted improvement. Whatever the reason, a noticeable calming of the ejecting action occurs and a much more uniform discharge of the fruit is observed.

While we have described in detail a preferred embodiment of the invention, it is to be understood that such embodiment is illustrative and not restrictive of the invention, the scope of which is defined in the appended claims. All modifications which come within the meaning and range of equivalency of the claims are therefore intended to be included therein.

We claim as our invention:

1. An improvement in a machine for sizing cored fruit by their maximum diameters transverse of their core axes, which machine is of the type having an ejector wheel and a right angled V-shaped sizing trough thereunder with a flat sizing belt travelling on the front wall of the trough opposite the ejector wheel so that fruit fed to the trough is caused to spin crown-pulley-wise on said belt with its core axis normal to the back wall of the trough and parallel to the plane of the belt while being translated along the trough to present its transverse diameters under the ejector wheel; said improvement residing in the combination, with the back wall of the trough, of a second flat belt mounted to travel along the back wall of the trough and under said ejector wheel, said second belt having its surface plane at right angles to that of the sizing belt, and said second belt being driven in the same direction as said sizing belt and at a speed, approximately one-third that of the sizing belt, that presents the spinning fruit to the sizing wheel with a translational speed substantially equal to half the lineal speed of the sizing belt.

2. An improvement in a machine for sizing cored fruit by their maximum diameters transverse of their core axes, which machine is of the type having an ejector wheel, an upedging means in advance of the ejector wheel for bearing down upon fruit passing toward the ejector wheel, and a right angled V-shaped sizing trough thereunder with a flat sizing belt travelling on the front wall of the trough opposite the upedging means and ejector wheel so that fruit fed to the trough is caused to spin crown-pulley-wise on said belt with its core axis normal to the back wall of the trough and parallel to the plane of the belt while being translated along the trough to present its transverse diameters under the ejector wheel; said improvement residing in the combination, with the back wall of the trough, of a second flat belt mounted to travel along the back wall of the trough and under said upedging means and ejector wheel, said second belt having its surface plane at right angles to that of the sizing belt, and said second belt being driven in the same direction as said sizing belt and at a speed, approximately one-third that of the sizing belt, that presents the spinning fruit to the upedging means and sizing wheel with a translational speed substantially equal to half the lineal speed of the sizing belt.

3. An improvement in a machine for sizing cored fruit by their maximum diameters transverse of their core axes, which machine is of the type having a right angled V-shaped trough with a flat sizing belt travelling on the front wall of the trough and with an upedging means positioned above the trough to bear down on fruit travelling along the trough for causing such fruit to spin crown-pulley-wise on said belt with its core axis normal to the back wall of the trough and parallel to the plane of the belt as it is translated along the trough; said improvement residing in the combination, with the back wall of the trough, of a second flat belt mounted to travel along the back wall of the trough and under said upedging means, said second belt having its surface plane at right angles to that of the sizing belt, and said second belt being driven at a speed, approximately one-third that of the sizing belt, that combines with the speed of the sizing belt to cause fruit spinning crown-pulley-wise thereon to have a translational speed longitudinal of the trough substantially equal to one-half the lineal speed of the sizing belt so that contact of the upedging means with fruit properly spinning on the sizing belt produces little if any alteration in the translational and rotational speeds thereof, and so that fruit upedged and started spinning by said upedging means undergoes little if any change in translational and rotational speeds as it leaves the upedging means.

4. An improvement in a machine for sizing cored fruit by maximum diameters transverse of the core axis thereof, which machine is of the type having a substantially right angled V-shaped sizing trough with a sizing belt travelling on the front wall of the trough for causing the fruit to spin crown-pulley-wise on the belt with the core axis thereof parallel to the belt plane and with a laterally moving ejector positioned above the trough for gauging transverse diameters of spinning fruit presented normal to the plane of the belt and for ejecting such fruit parallel to the plane of the belt; said improvement residing in the combination with the back wall of the trough of a second flat belt mounted to travel along the back wall of the trough and under said ejector, said second belt having its surface plane forming a trough with the sizing belt, and said second belt being driven in the same direction as said sizing belt and at a lower speed which coacts with the speed of the sizing belt to present the spinning fruit to the said ejector with a translational speed about equal to half the speed of the sizing belt.

EDWIN M. WAYLAND.
CHARLES WALTON SMITH.

REFERENCES CITED

The following references are of record in the file of this patent:

UNITED STATES PATENTS

| Number | Name | Date |
|---|---|---|
| 931,993 | Cory | Aug. 24, 1909 |
| 1,696,066 | Wayland | Dec. 28, 1928 |
| 1,925,158 | Wayland | Sept. 5, 1933 |
| 2,471,479 | Coons | May 31, 1949 |